(12) United States Patent
Trimble

(10) Patent No.: US 12,014,061 B2
(45) Date of Patent: Jun. 18, 2024

(54) CAPACITY AND PERFORMANCE OPTIMIZATION IN NON-HOMOGENEOUS STORAGE

(71) Applicant: Hitachi Vantara LLC, Santa Clara, CA (US)

(72) Inventor: Ronald Ray Trimble, Acton, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 17/909,784

(22) PCT Filed: Mar. 9, 2020

(86) PCT No.: PCT/US2020/021669
§ 371 (c)(1),
(2) Date: Sep. 7, 2022

(87) PCT Pub. No.: WO2021/183097
PCT Pub. Date: Sep. 16, 2021

(65) Prior Publication Data
US 2023/0333760 A1     Oct. 19, 2023

(51) Int. Cl.
*G06F 3/06*     (2006.01)
(52) U.S. Cl.
CPC ............ *G06F 3/0635* (2013.01); *G06F 3/061* (2013.01); *G06F 3/067* (2013.01)
(58) Field of Classification Search
CPC ......... G06F 3/0635; G06F 3/061; G06F 3/067
USPC ........................................................ 711/154
See application file for complete search history.

(56) References Cited

U.S. PATENT DOCUMENTS

| 6,311,251 | B1 | 10/2001 | Merritt et al. |
| 6,928,459 | B1 | 8/2005 | Sawdon et al. |
| 8,554,918 | B1 * | 10/2013 | Douglis ............... G06F 11/1458 707/640 |

(Continued)

OTHER PUBLICATIONS

Nikolaos Laoutaris et al., "On the optimization of Storage Capacity Allocation for Content Distribution", Computer Networks 47.3., Dec. 18, 2003.

(Continued)

*Primary Examiner* — Titus Wong
(74) *Attorney, Agent, or Firm* — MATTINGLY & MALUR, PC

(57) ABSTRACT

In some examples, a computing device may be configured to store data to storage subsystems in a storage pool. The computing device may determine, for each storage subsystem, a performance potential quantity representative of a relative performance of the storage subsystem, and may determine a respective initial distribution weighting for each storage subsystem based at least on the performance potential quantities. Further, the computing device may determine, for each storage subsystem having a percentage of storage capacity used that is more than a threshold amount greater than a percentage of storage capacity used by the storage subsystem having a lowest percentage of storage capacity used, one or more amounts by which to adjust the initial distribution weighting to determine a respective desired distribution weighting for each storage subsystem. The computing device may select one or more storage subsystems to receive data based at least on the desired distribution weightings.

20 Claims, 8 Drawing Sheets

(56) References Cited

U.S. PATENT DOCUMENTS

| | | | |
|---|---|---|---|
| 8,566,546 B1* | 10/2013 | Marshak | G06F 3/0689 |
| | | | 711/112 |
| 8,838,931 B1* | 9/2014 | Marshak | G06F 3/0605 |
| | | | 711/170 |
| 8,868,797 B1* | 10/2014 | Kirac | G06F 3/061 |
| | | | 710/15 |
| 9,026,765 B1* | 5/2015 | Marshak | G06F 3/061 |
| | | | 711/170 |
| 9,286,200 B2 | 3/2016 | Kawaguchi | |
| 9,507,887 B1* | 11/2016 | Wang | G06F 3/0685 |
| 9,898,224 B1* | 2/2018 | Marshak | G06F 3/0647 |
| 9,940,024 B1* | 4/2018 | Aharoni | G06F 11/3433 |
| 10,078,569 B1* | 9/2018 | Alshawabkeh | G06F 3/067 |
| 10,339,455 B1* | 7/2019 | Parush-Tzur | G06F 3/061 |
| 2009/0271485 A1 | 10/2009 | Sawyer et al. | |
| 2012/0047346 A1 | 2/2012 | Kawaguchi | |
| 2012/0259901 A1 | 10/2012 | Lee et al. | |
| 2016/0179642 A1* | 6/2016 | Cai | H04L 67/1034 |
| | | | 714/4.12 |

OTHER PUBLICATIONS

International Search Report of PCT/US2020/021669 dated Jun. 2020.

* cited by examiner

CAPACITY AND PERFORMANCE OPTIMIZATION IN NON-HOMOGENEOUS STORAGE

TECHNICAL FIELD

This disclosure relates to the technical field of data storage.

BACKGROUND

Data objects and other types of data may be stored in a storage pool or other storage system arrangement that may including multiple data storage subsystems. The storage system may be expanded by adding new subsystems that may also have increased performance and/or capacity when compared with the existing subsystems in the storage system. Thus, the storage system may end up with a plurality of subsystems that are non-homogeneous with respect to capacity and/or performance. For example, each subsystem might have a different performance and capacity from other subsystems in the storage system, which can complicate load balancing and data distribution. For instance, in such a situation, merely distributing the data evenly across the storage subsystems does not account for the better performance of the higher performing subsystems.

SUMMARY

Some implementations include a computing device configured to store data to storage subsystems in a storage pool. The computing device may determine, for each storage subsystem, a performance potential quantity representative of a relative performance of the storage subsystem, and may determine a respective initial distribution weighting for each storage subsystem based at least on the performance potential quantities. Further, the computing device may determine, for each storage subsystem having a percentage of storage capacity used that is more than a threshold amount greater than a percentage of storage capacity used by the storage subsystem having a lowest percentage of storage capacity used, one or more amounts by which to adjust the initial distribution weighting to determine a respective desired distribution weighting for each storage subsystem. The computing device may select one or more of the storage subsystems to receive data based at least on the desired distribution weightings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
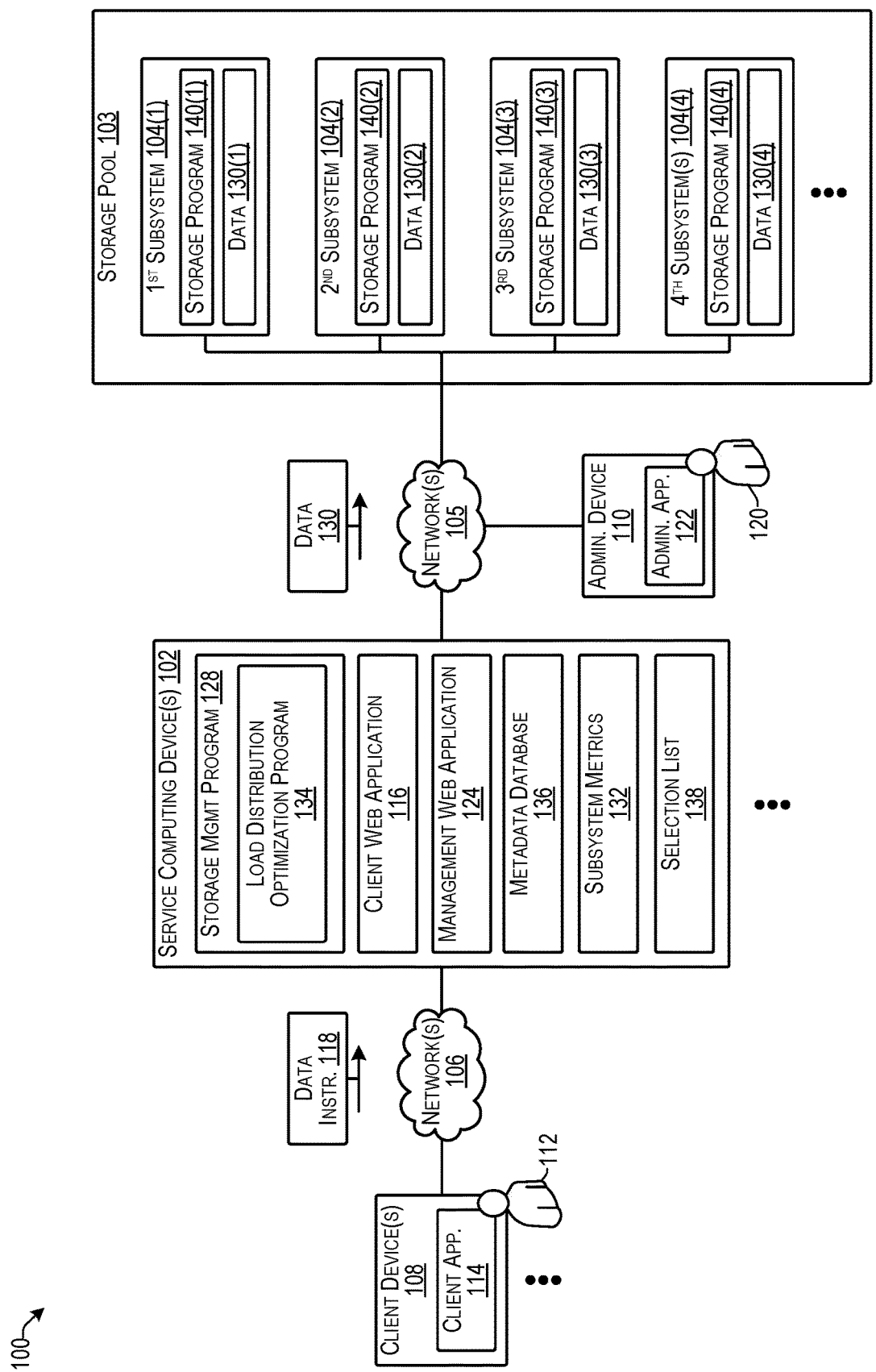
FIG. 1 illustrates an example architecture of a system able to store data to a plurality of non-homogenous storage subsystems according to some implementations.

Some implementations herein are directed to techniques and arrangements for optimizing usage of data storage pools or other groups of storage subsystems. For example, distribution of data for storage in individual subsystems in a storage pool may be controlled to optimize performance while maintaining similar levels of capacity usage across the plurality of subsystems. A weighting (also referred to herein as a skew) may be user configurable to focus more on increased performance or on capacity management. The performance and capacities of the subsystems may be reported by the subsystems or may be determined and maintained by one or more service nodes. The solution herein optimizes performance while generally evenly filling the storage capacity of the subsystems. Implementations herein are able to optimize performance of pools non-homogeneous storage subsystems without causing capacity issues. Thus, the system uses the performance capability and capacity of the subsystems to calculate the optimal distribution.

Some examples herein optimize performance of a plurality of storage subsystems while evenly distributing data across the subsystems. The system enables a user to configure a configurable weighting (skew) for capacity versus performance. For instance, a higher skew may place more emphasis on selecting the least full subsystem in the storage pool, while a lower skew may emphasize higher performance with less concern for evenly distributing capacity. Further, the determined distribution may be optimized for individual storage performance of the individual subsystems and may provide for even distribution when all subsystems are identical. In addition, the system may be configured to distribute data based on individual statistics and results and/or may maintain a distribution based on throughput.

The workload distribution herein may track busy threads and maintain expected busy percentages. Additionally, when capacities diverge, a combination of capacity skew with optimal performance distribution may result in steady performance for the storage pool. For instance, the highest performing device may receive less data ingest as it becomes fuller. In addition, the data distribution process herein may be employed with any practical number of storage subsystems in a storage pool, and may avoid out-of-capacity errors by redirecting data storage based on capacity, such as when one of the storage subsystems approaches full storage capacity.

Some examples herein include a data distribution algorithm that takes into consideration the combined performance and capacities of a plurality of non-homogeneous storage subsystems to optimize performance while resulting in a similar percentage of usage of the subsystems. The system may further include a sliding scale adjustment to enable a user to manually adjust a weighting to focus the resulting data distribution more on performance or more on capacity. The system herein may provide consistent pool performance with some calculable discrepancy in capacity usage between the subsystems, such as based on the adjustment of the weighting skew to focus on subsystem capacity or subsystem performance.

For discussion purposes, some example implementations are described in the environment of one or more service computing devices in communication with a plurality of non-homogeneous storage subsystems for managing distribution of data in an optimal manner based on balancing performance and capacity usage of the storage subsystems. However, implementations herein are not limited to the particular examples provided, and may be extended to other types of computing system architectures, other types of storage environments, other types of client configurations, other types of data, and so forth, as will be apparent to those of skill in the art in light of the disclosure herein.

FIG. 1 illustrates an example architecture of a system 100 able to store data to a plurality of non-homogenous storage subsystems according to some implementations. The system 100 includes one or more service computing devices 102 that are able to communicate with, or otherwise coupled to, a storage pool 103 including a plurality of storage subsystems 104, such as a first subsystem 104(1), a second subsystem 104(2), a third subsystem 104(3), a fourth subsystem 104(4), and so forth, such as through one or more networks 105. The subsystems 104(1)-104(4) may each include one or more computing devices (not shown in FIG. 1) that manage a plurality of designated storage devices separately from each of the other subsystems 104(1)-104(4). Additional details of the subsystems 104 are discussed below with respect to FIG. 8.

Further, the service computing device(s) 102 are able to communicate over one or more networks 106 with one or more user computing devices 108. For example, the service computing device(s) 102 may be access nodes, server nodes, management nodes, and/or other types of service nodes that provide the client devices with access to the storage pool 104 for enabling the client devices to store data in the storage pool 104, as well as performing other management and control functions, as discussed additionally below.

The service computing device(s) 102 may also be able to communicate with one or more administrator computing devices 110, such as through the network(s) 105, or alternatively, through the network(s) 106. For example, the administrator computing device 110 may be used for configuring the service computing device(s) 102 and/or the storage pool 104. The client device 108 and the administrator device 110 may be any of various types of computing devices, as discussed additionally below.

In some examples, the service computing device(s) 102 may include one or more servers that may be embodied in any number of ways. For instance, the programs, other functional components, and at least a portion of data storage of the service computing device(s) 102 may be implemented on at least one server, such as in a cluster of servers, a server farm, a data center, a cloud-hosted computing service, and so forth, although other computer architectures may additionally or alternatively be used. As another example, the service computing device(s) 102 may be abstracted as or otherwise treated as a single node that is actually a cluster containing multiple service computing devices 102. Additional details of the service computing device(s) 102 are discussed below with respect to FIG. 7.

The one or more networks 105 and 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 105 and 106 may include both wired and/or wireless communication technologies. Components used for such communications can depend at least in part upon the type of network, the environment selected, or both. Protocols for communicating over such networks are well known and will not be discussed herein in detail. As one example, the network(s) 105 may be a private network, such as a LAN, storage area network (SAN), Fibre Channel network, while the network(s) 106 may be a public network that may include the Internet in some cases, or a combination of public and private networks. Implementations herein are not limited to any particular type of network as the networks 105 and 106.

The service computing device(s) 102 may be configured to provide storage and data management services to client users 112 via the client device(s) 108 respectively. As several nonlimiting examples, the users 112 may include users performing functions for businesses, enterprises, organizations, governmental entities, academic entities, or the like, and which may include storage of very large quantities of data in some examples. Nevertheless, implementations herein are not limited to any particular use or application for the system 100 and the other systems and arrangements described herein.

Each client device 108 may be any suitable type of computing device such as a desktop, laptop, tablet computing device, mobile device, smart phone, wearable device, terminal, and/or any other type of computing device able to send data over a network. Users 112 may be associated with client device(s) 108 such as through a respective user account, user login credentials, or the like. Furthermore, the client device(s) 108 may be configured to communicate with the service computing device(s) 102 through the one or more networks 106, through separate networks, or through any other suitable type of communication connection. Numerous other variations will be apparent to those of skill in the art having the benefit of the disclosure herein.

Further, each client device 108 may include a respective instance of a user application 114 that may execute on the client device 108, such as for communicating with a client web application 116 executable on the service computing device(s) 102, such as for sending user data for storage on the subsystems 104 and/or for receiving stored data from the subsystems 104 through a data instruction 118, such as a write operation, read operation, delete operation, or the like. In some cases, the application 114 may include a browser or may operate through a browser, while in other cases, the application 114 may include any other type of application having communication functionality enabling communication with the client web application 116 or other application on the service computing device(s) 102 over the one or more networks 106. Accordingly, the service computing device(s) 102 may provide storage for the users 112 and respective client device(s) 108. During steady state operation there may be users 112 periodically communicating with the service computing device(s) 102.

In addition, the administrator device 110 may be any suitable type of computing device such as a desktop, laptop, tablet computing device, mobile device, smart phone, wearable device, terminal, and/or any other type of computing device able to send data over a network. An administrator 120 may be associated with the administrator device 110, such as through a respective administrator account, administrator login credentials, or the like. Furthermore, the administrator device 110 may be able to communicate with the service computing device(s) 102 through the one or more networks 106, 107, through separate networks, or through any other suitable type of communication connection.

Further, each administrator device 110 may include a respective instance of an administrator application 122 that may execute on the administrator device 110, such as for communicating with a management web application 124 executable on the service computing device(s) 102, such as for sending management instructions for managing the system 100, as well as for sending management data for storage on the subsystems 104 and/or for receiving stored management data from the subsystems 104, such as through a management instruction or the like. In some cases, the administrator application 122 may include a browser or may operate through a browser, while in other cases, the administrator application 122 may include any other type of application having communication functionality enabling communication with the management web application 124 or other applications on the service computing device(s) 102 or the subsystems 104 over the one or more networks 107 or 106.

The service computing device(s) 102 may execute a storage management program 128, which may provide access to the subsystems 104, such as for sending data 130 to be stored to the subsystems 104 and for retrieving requested data 130 from the subsystems 104. In addition, the storage management program 128 may manage the data stored by the system 100, such as for managing data retention periods, data protection levels, data replication, and so forth. In some cases, the storage management program 128 may periodically receive subsystem metrics 132 from the respective subsystems 104, such as performance metrics, capacity usage metrics, and so forth. Furthermore, as discussed additionally below, the storage management program 128 may include a load distribution optimization program 134 that may optimize performance of the subsystems 104 while generally balancing the storage capacity of the subsystems 104.

In this example, the load distribution optimization program 134 is illustrated as part of the storage management program 128. In other examples, however, the load distribution optimization program 134 may be a separate program from the storage management program 128, and may be invoked by the storage management program 128 or other program executing on the service computing device 102, the administrator device 110, or the like.

The service computing device(s) 102 may further include a metadata database (DB) 136, which may be distributed across one or more of the service computing device(s) 102. For example, the metadata DB 136 may be used for managing the data 130 stored at the subsystems 104. The metadata DB 136 may include numerous metadata about the data 136, such as information about individual data objects or other data, how to access the data, storage protection levels for the data, storage retention periods, data owner information, data size, data type, and so forth. Further, the storage management program 138 may manage and maintain the metadata DB 136 such as for updating the metadata DB 136 as new data is stored, old data is deleted, data is migrated, and the like, as well as responding to requests for accessing the data 130.

As one example, the storage management program 128 may receive a data instruction to store the data 130 to the storage pool 103. The storage management program 128 may select a destination subsystem 104 based at least in part on the selection list 138. The storage management program 128 may add metadata for the data 130 to the metadata database 136, and may send the data 130 to the selected subsystem 104. The connection count for the selected subsystem 104 may be incremented by one. After the transmission of the data 130 to the selected subsystem 104 completes, the connection count to the selected subsystem 104 may be decremented by one, and the storage management program 128 may initiate a reply to the requesting client device 108 with a completion message indicating success, failure, or the like. Details of determining the selection list 138 are discussed additionally below.

Each subsystem 104(1)-104(4) may execute a storage program 140(1)-140(4), respectively, for managing storage of respective data 130(1)-130(4) at the respective subsystem 104(1)-104(4). For instance, the storage program 140 may receive data 130 from the storage management program 128 at the service computing device(s) 102, may store the data 130 on one or more storage devices at the subsystem 104, and may retrieve and send requested data to the storage management program 128, such as in response to a client read request, or the like. The storage program 140 may also provide information to the storage management program 128, such as performance information, capacity usage information, and so forth for the respective storage devices managed by the particular storage program 140 on a particular one of the subsystems 104.

Figure 2:
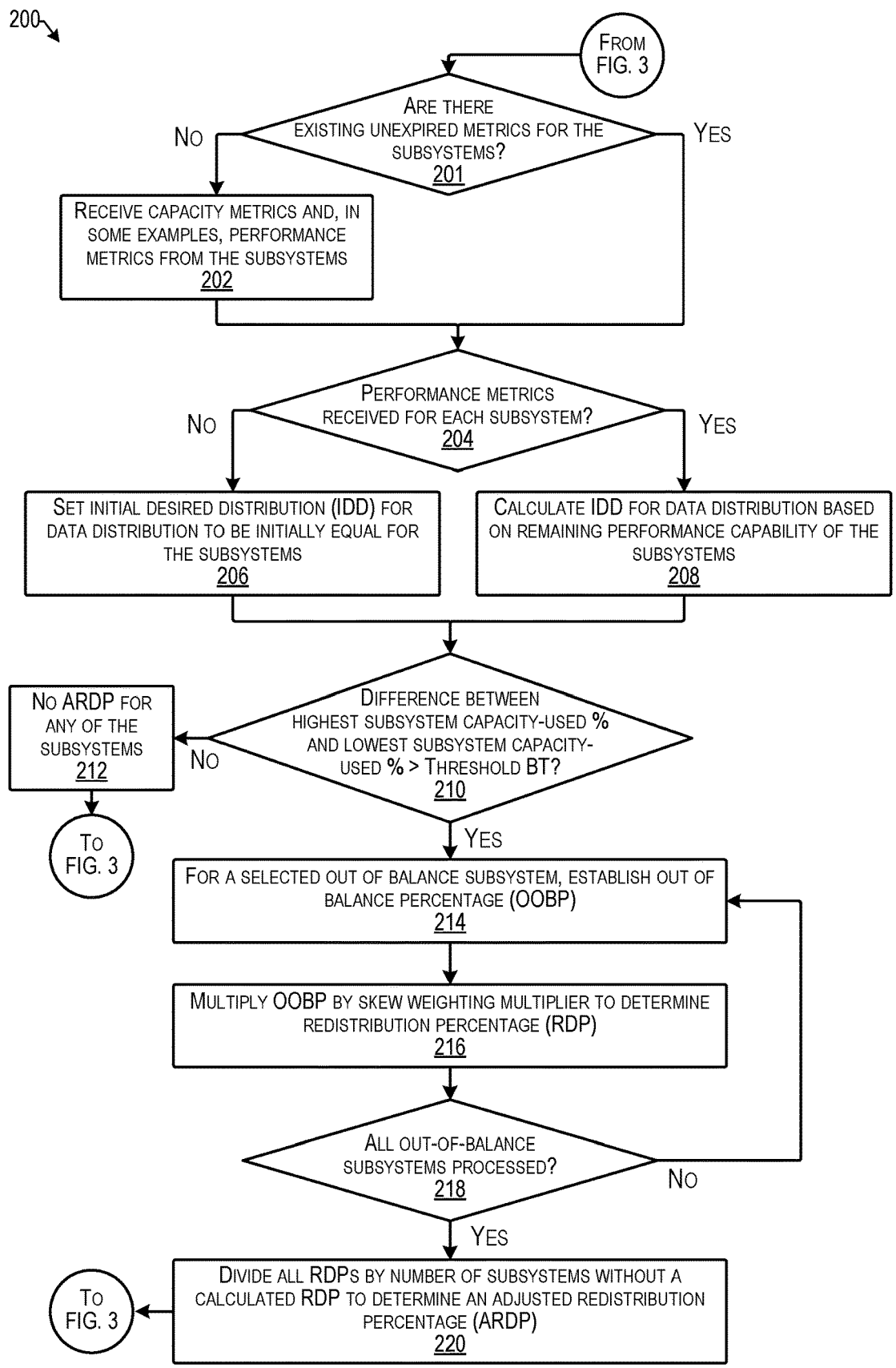
FIG. 2 illustrates a flow diagram of a first portion of the process for optimizing and controlling traffic distribution according to some implementations.
Figure 3:
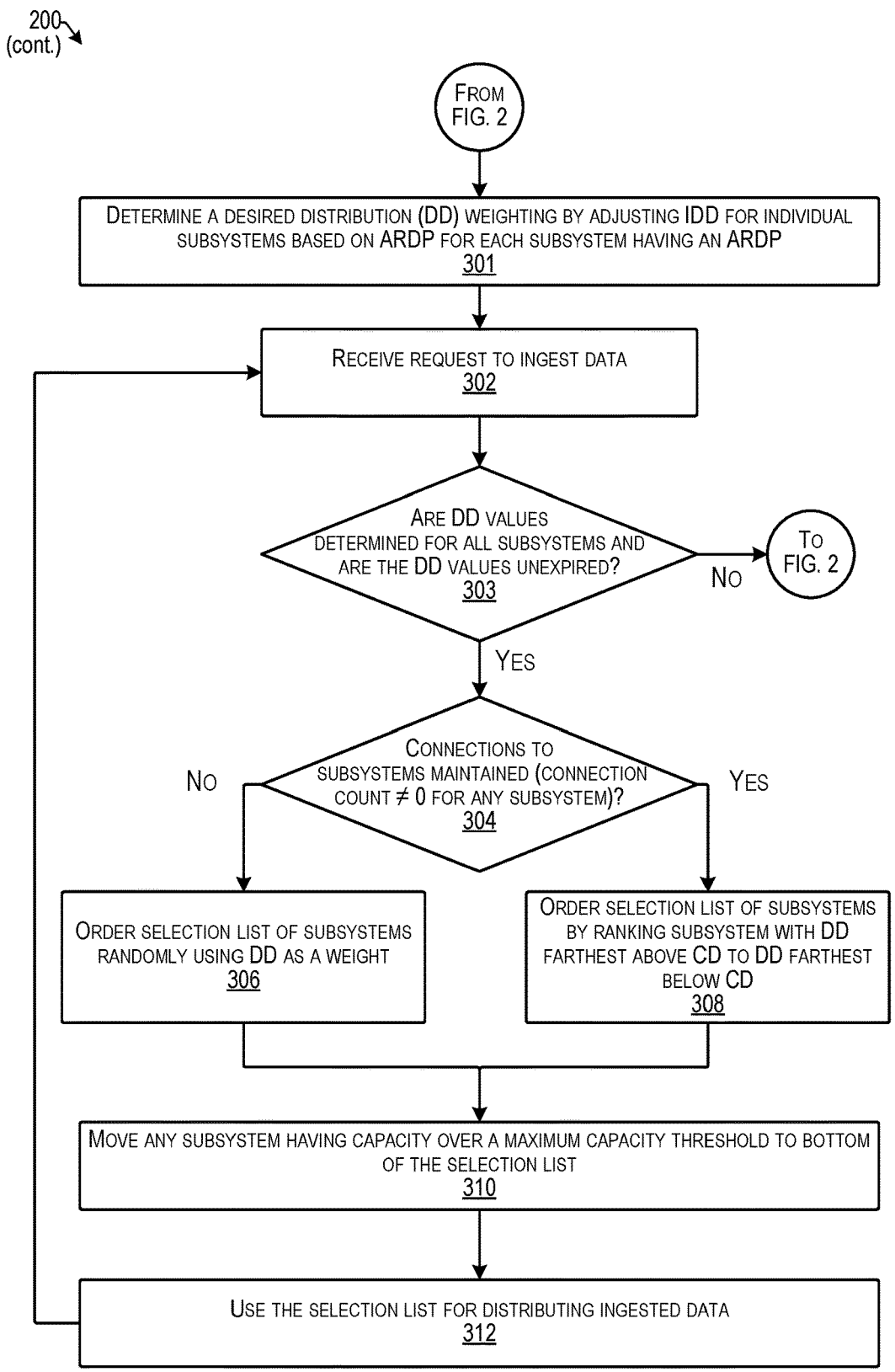
FIG. 3 illustrates a flow diagram of a continuation of the process for optimizing and controlling traffic distribution according to some implementations.

FIGS. 2 and 3 are flow diagrams illustrating an example process 200 for optimizing and controlling traffic distribution according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems.

The load distribution optimization program 134 may be based in part on the following algorithms. For example, suppose that a value $C_n$ represents the percent of capacity used in one storage subsystems 104 in the storage pool 103 where n is a number between 1 and the number of subsystems 104 in the storage pool 103. Thus, $C_n$ may equal (Used capacity/Total Capacity)*100. Further, suppose that $C_{min}$ is the percent of capacity used on the minimum percentage-used subsystem (i.e., the minimum $C_n$ in the pool). Further, suppose that BT is the balance threshold percentage, e.g., any subsystem with a $C_n$ not more than the value BT above $C_{min}$ is considered balanced. If all systems are balanced, the data distribution is based completely on performance and not at all on capacity regardless of the value of the skew multiplier S. Accordingly, $(C_n-C_{min})$ may represent the out of balance percentage for one storage subsystem 104 in the storage pool 103. This value is 0 for $C_{min}$ and effectively 0 for any subsystem where $(C_n-C_{min}) \leq BT$. Further, suppose that $D_n$ is the percent of distribution of traffic for a particular storage subsystem. The sum of all $D_n$ in the storage pool may always be 100%.

For balanced systems where $(C_n-C_{min}) \leq BT$, then $D_n$ may be calculated as follows:

$$D_n = T_n/TP + \text{SUM(where} \quad (C_x-C_{min} \leq BT)(\text{MIN} \\ ((C_x-C_{min})*S, 100\%)*T_x/TP/NB) \quad \text{EQ (1)}$$

In EQ (1), $T_n$ is the max throughput of one storage subsystem in a pool where n is a number between 1 and the number of subsystems in the pool. The units may be in MB/sec, or other consistent units. The value for $T_n$ may be limited by any number of performance characteristics, such as disk speed, network bandwidth, and CPU limitations.

In addition, in EQ (1), TP may represent the total throughput capability of the subsystems 104 in the storage pool 103, i.e., the sum of all $T_n$ in the storage pool 103.

In addition, in EQ (1), S may represent the skew multiplier for controlling performance vs. capacity. For example, a high number distribute data solely based on capacity, while 0 vale results in data distribution solely based on subsystem performance capability. When S is set equal to 1, the system may distribute traffic based on a generally even application of performance and capacity.

In addition, in EQ (1), Cx may be the same as $C_n$ for an unbalanced subsystem in the pool, where x is a number between 1 and the number of unbalanced subsystems ($(C_n-C_{min})>BT$) in the storage pool 103.

In addition, in EQ (1), Tx may be the same as Tn for an unbalanced subsystem in the pool 103, where x is a number between 1 and the number of unbalanced subsystems ($(C_n-C_{min})>BT$) in the storage pool 103.

In addition, in EQ (1), NB may represent the number of balanced subsystems 104 in the pool 103, i.e., the number of subsystems 104 in which $(C_n-C_{min}) \leq BT$.

Furthermore, for unbalanced subsystems 104 in the storage pool 103 where $(C_n-C_{min})>BT$, then $D_n$ may be calculated as follows:

$$D_n = \text{MAX}((100\%-(C_n-C_{min})*S)*T_n/TP, 0\%) \quad \text{EQ (2)}$$

where the values for $C_n$, $C_{min}$, S, $T_n$, and TP may be the same as those discussed above with respect to EQ (1).

In the following examples of FIGS. 2-6, some concepts of the above discussed equations may be generalized and applied in part for determining and controlling the distribution of ingested data traffic among a plurality of subsystems 104, such as in the storage pool 103 in the example system 100 discussed above with respect to FIG. 1. For instance, suppose that the balance threshold BT, i.e., the acceptable percentage difference between percentage of capacity used in the subsystems 104 in the pool 103, is configured at a default value such as 2%. Further, suppose that an initial desired distribution (IDD) is the percentage of connections each storage subsystem 104 in the pool 103 is expected to get based on performance. The IDD may be a weighting based solely on the performance and not capacity of the respective subsystem 104. In addition, an out of balance percentage (OOBP) may represent the increase in percentage used of one storage subsystem 104 over another when that increase exceeds the BT. The OOBP may be calculated against the storage subsystem 104 with the minimum percentage of used capacity. Further, a redistribution percentage (RDP) may represent the amount of the IDD to be subtracted from one of the subsystems filled above the balance threshold and added to the balanced minimum filled subsystems. The RDP may be used to determine an adjusted redistribution percentage (ARDP), which is the amount of the IDD that will be distributed from an unbalanced subsystem to one of the minimum balanced subsystems, e.g., ARDP=(RDP/Number of balanced subsystems). In addition, the current distribution (CD) may represent the percentage of open connections on a storage subsystem in the pool. The CD may be calculated as CD=(100%*Open connections on the subsystem/Open connections in the pool). Further, the desired distribution (DD) may be a weighting that indicates the percentage of traffic to be directed to each of the subsystems 104.

FIG. 2 illustrates a flow diagram of a first portion of the process 200 for optimizing and controlling traffic distribution according to some implementations. In the example of FIG. 2, the process 200 may be executed at least in part by the one or more service computing device(s) 102 executing the load distribution optimization program 134 of the storage management program 128 or the like.

The load distribution optimization program 134 combines performance and capacity of the storage subsystems 104 to optimize performance while resulting in similar percentage usage of the capacity of the subsystems 104. The load distribution optimization program 134 may perform the optimization even when the subsystems are completely different (non-homogeneous) with respect to performance and capacity.

In some cases, the load distribution optimization program 134 may include a skew multiplier which is a weighting multiplier that can be used to adjust the focus of the optimization more toward performance or more toward capacity balancing. In implementations herein, a "0" value for the skew multiplier may always direct traffic to achieve the highest performance without concern for capacity usage until a respective subsystem 104 completely fills. On the other hand, a high value for the skew multiplier (e.g., substantially greater than "1" may direct all traffic in a manner to balance the capacities of the storage subsystems 104 and ignore performance of the individual subsystems 104. When the skew multiplier value exceeds (100%/Balance Threshold), no traffic will go to an unbalanced subsystem. A skew multiplier value of "1" allows capacity and performance to have equal weight.

In some examples herein, a storage pool 103 including a plurality of subsystems 104 may become out of balance in multiple scenarios. As one example, a new subsystem 104 may be added to an ageing and filling storage pool 103. When the new (and presumably empty) subsystem 104 is added to the storage pool 103, the load distribution optimization program 134 takes advantage of the less-filled newly-added storage capacity while maintaining an optimal performance. As the new subsystem 104 may be expected to fill faster than the existing subsystems 104, the out-of-balance difference among all the subsystems 104 becomes less, and data that is newly ingested may be gradually directed to the existing partially filled subsystems 104.

If all the subsystems 104 have the same performance characteristics, these subsystems 104 may continually approach a balanced capacity while optimizing performance. If the subsystems 104 have different performance with respect to each other, the load distribution optimization program 134 may allow a faster system to fill faster. In that case, the subsystems 104 may move from balanced capacity to out-of-balance capacity. In this situation, the load distribution optimization program 134 starts to restrict flow of new data to the faster (higher performance) subsystem that is filling faster. The performance across the subsystems 104 may eventually stabilize based on the skew multiplier as the focus gradually merges to the less-filled slower-filling subsystem(s) 104.

At 201, the service computing device may determine whether there are existing unexpired metrics for the subsystems 104. If so, the process may go to 204. If not, the process may go to 202 to obtain metrics for the subsystems 104.

At 202, the service computing device may receive capacity metrics and, in some examples, performance metrics for the subsystems 104. For example, the service computing device may request metrics from the subsystems 104, wait to receive the metrics periodically, or may calculate metrics based on information determined by the service computing device(s) 102. In some examples, the subsystems 104 may be configured to periodically send performance and capacity metrics to the service computing device 102. As several nonlimiting examples, the period of time may be 1 minute, 2 minutes, 3 minutes, 5 minutes, 15 minutes, every half hour, hourly, daily, or the like.

At 204, the service computing device may determine whether performance metrics have been received for each subsystem 104. If so, the process goes to 208. If not, the process goes to 206.

At 206, when performance metrics have not been received for all the connected subsystems 104, the service computing device may set the initial desired distribution (IDD) for data distribution to be initially equal across all the subsystems 104. For example, if any of the subsystems 104 in the storage pool 103 do not return performance metrics, then the initial desired distribution IDD may be evenly distributed among the subsystems 104 in the storage pool 103. Additionally, or alternatively, even though performance metrics might not be returned by a particular subsystem 104, the performance metrics may be calculated by the service computing device(s) 102, such as based on results for subsequent calculations.

At 208, when performance metrics have been received for all of the subsystems 104 in the storage pool 103, the service computing device may calculate the IDD for data distribution based on remaining performance capabilities of the subsystems 104. For instance, the IDD of each subsystem 104 may be calculated as the available performance capability of that subsystem divided by the sum of available performance capability for all the subsystems 104.

At 210, the service computing device may determine whether a difference between the highest subsystem capacity-used percentage and the lowest subsystem capacity-used percentage is greater than the balance threshold BT for the difference. If not, then the process goes to 212. On the other hand, if the difference is greater than the balance threshold BT, then the process goes to 214.

At 212, when the difference is not greater than the balance threshold BT for any of the subsystems 104, then the subsystems 104 have balanced capacity and none of the subsystems 104 will have a redistribution percentage (RDP) or an adjusted redistribution percentage (ARDP). Accordingly, blocks 214-220 may be skipped and the process may go to FIG. 3, block 301.

At 214, when the difference between the highest subsystem capacity-used percentage and the lowest subsystem capacity-used percentage is greater than the balance threshold BT, the service computing device may, for each subsystem that exceeds the balance threshold BT, determine an out of balance percentage (OOBP). For example, the OOBP may be equal to the percentage capacity of the subsystem minus the lowest percent capacity used by any of the subsystems 104 in the storage pool 103.

At 216, the service computing device may multiply the OOBP by the skew multiplier (also referred to herein as a weighting multiplier) to determine a redistribution percentage (RDP). For example, the RDP is the percentage of the initial distribution that will be redistributed evenly from the selected subsystem to a less filled subsystem.

At 218, the service computing device may determine whether all out-of-balance subsystems have been processed for determining the OOBP and RDP. If so, the process goes to 220. If not, the process goes back to 214 to select another out-of-balance subsystem for determining the OOBP and RDP. This will result in an RDP being determined for each subsystem with a percent capacity used that is higher than the percent used on the lowest-percentage used subsystem by more than the balance threshold BT.

At 220, the service computing device may divide all the RDP's by the number of subsystems for which an RDP was not calculated to determine an adjusted redistribution percentage ARDP. As mentioned above, an RDP is not calculated for any subsystems within the balance threshold BT of the lowest filled subsystem.

FIG. 3 illustrates a flow diagram of a continuation of the process 200 for optimizing and controlling traffic distribution according to some implementations.

At 301, the service computing device may determine a desired distribution DD weighting for each subsystem 104 by multiplying the IDD for individual subsystems by the ARDP percentage and, for each subsystem having an ARDP, subtracting the RDP from the IDD (or, to achieve the same result, subtracting the product from the IDD once for every balanced subsystem in the storage pool). For each subsystem not having an ARDP, the products of the ARDPs and the IDDs from the subsystems that do have an ARDP are added to the IDD for those systems. In the case that none of the subsystems 104 have an ARDP, then the respective IDD is also the respective DD for the respective subsystems 104.

At 302, the service computing device may receive a data ingest request. As one example, as discussed above with respect to FIG. 1 a client device may request to store data to the storage pool 103. Various other sources of data ingest requests will be apparent to those of skill in the art having the benefit of the disclosure herein.

At 303, the service computing device may determine whether desired distribution DD values are established for all subsystems 104 and not expired. For example, the subsystem metrics may have an expiration, such as based on a fixed expiration time, based on a percentage change in one or more metrics, based on receipt of new metrics, or the like. In some cases, the metrics may be maintained at a separate computing device, such as within or outside the system 100. In addition, the desired distribution DD values may also have an expiration, which may be related to the metrics expiration in some cases, or which may be unrelated and managed separately in other cases. In addition, in some examples, the DD values might only be calculated in response to receiving a data ingest request. If the DD values have been calculated and are not expired, the process goes to 304. If the DD values have not been calculated or are expired, the process goes to FIG. 2 to execute block 201.

At 304, the service computing device may determine whether all subsystem connections have been maintained or that none of the current connection counts for the subsystems is zero. The connections may be maintained by the service computing device(s) 102, such as based on actual usage of the ranked selection list 138. For example, following determination of the desired distribution, if one or more of the subsystems 104 no longer has any connections, then the determined distribution may be invalid. If the condition is met, the process goes to 308. If the condition is not met, the process goes to 306.

At 306, if one or more of the subsystems are no longer connected or the connections are not otherwise maintained (e.g., at least one subsystem has zero connections), the service computing device may arrange the order of the selection list 138 of the subsystems 104 randomly using the respective desired distributions DDs as a weight.

At 308, if all of the subsystems 104 have at least one known connection, the service computing device may arrange the order of the selection list of subsystems by ranking the subsystem with the desired distribution DD furthest above the CD highest on the selection list 138, ranking the subsystem with the DD furthest below the CD lowest on the selection list 138, and ranking the other subsystems in between accordingly based on the respective distances of their respective DDs from the CD. For example, the current distribution CD may be calculated as 100*Open connection on the subsystem/open connections in the storage pool.

At 310, the service computing device may move any subsystem having a capacity usage over a maximum capacity usage threshold to the bottom of the selection list. As one nonlimiting example, suppose that the maximum capacity threshold is 90 percent filled. Accordingly, any subsystem having a capacity usage that is over 90 percent would be moved to the bottom of the selection list 138 regardless of the difference between the DD and the CD for that subsystem.

At 312, the service computing device may use the selection list 138 for distributing ingested data to the respective subsystems 104. For instance, the service computing device(s) 102 may distribute the ingested data among one or more of the subsystems 104 based on the rankings for each subsystem 104 in the selection list 138. For example, the service computing device may select the first subsystem in the selection list. The calculations herein do not need to understand the data protection levels (DPLs) being used for the data. For instance, more than one of the subsystems may be selected concurrently to satisfy a configured DPL, such as in the case that one or more redundant copies are stored. The process 200 may generate the DDs at intervals based on the storage pool 103. In some cases, each request may use the DD to generate the ranking for the selection list 138. After the ingested data is sent to a selected subsystem 104, the process may return to block 302 to wait for a next data ingest request to be received.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 4:
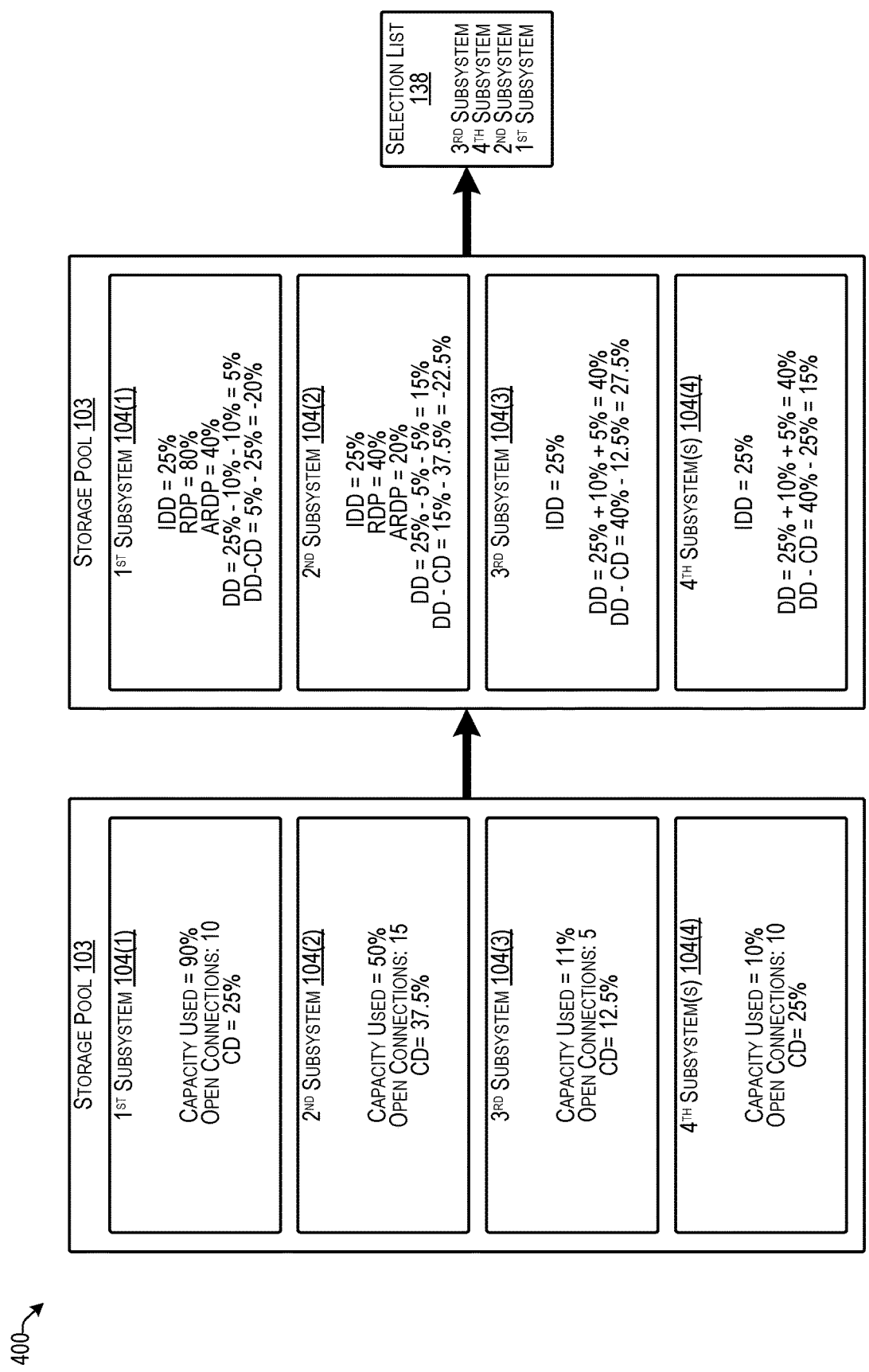
FIG. 4 is a block diagram illustrating an example of determining a selection list according to some implementations.

FIG. 4 is a block diagram illustrating an example 400 of determining a selection list 138 according to some implementations. In this example, suppose that the first subsystem 104(1) has 10 connections open, the second subsystem 104(2) has 15 connections open, the third subsystem 104(3) has 5 connections open, and the fourth subsystem 104(4) has 10 connections open. Accordingly, there are a total of 40 open connections. Thus, the current distribution CD of the first subsystem 104(1) is 25% (i.e., 10/40); the CD of the second subsystem 104(2) is 37.5% (15/40); the CD of the third subsystem 104(3) is 12.5% (5/40); and the CD of the fourth subsystem 104(4) is 25% (10/40). Further, in this example, suppose that the current capacity used of the first subsystem 104(1) is 90%; the current capacity used of the second subsystem 104(2) is 50%; the current capacity used of the third subsystem 104(3) is 11%; and the current capacity used of the fourth subsystem 104(4) is 10%.

In this example, suppose that the subsystems 104(1)-104(4) all have equal additional performance room of 100 MB/s, so the initial desired distribution IDD is 25% (100 MB/s/(4*100 MB/S) for each subsystem 104. In addition, the first subsystem 104(1) and the second subsystem 104(2) are more than the balance threshold BT of 2% above the minimum-filled subsystem 104(4), so an RDP may be calculated for both the first and second subsystems 104(1) and 104(2). In this example, suppose that the skew multiplier has a value of 1, i.e., corresponding to balanced performance and capacity balancing.

For the first subsystem 104(1), the OOBP is 90–10=80% out of balance. Since the skew multiplier is 1, the RDP is also 80%. The two minimum filled subsystems 104(3) and 104(4) are within 2% capacity of each other and therefore considered balanced, so for the first subsystem 104(1), the ARDP is 80%/2=40%.

For the second subsystem, the OOBP is 50–10=40%. The RDP also equals 40% and the ARDP is 40%/2 or 20%.

Next, the desired distribution DD may be determined for each subsystem 104(1)-104(4). The DD may be determined based on the rule that any subsystem 104(1)-104(4) with an ARDP should reduce its IDD by the ARDP for each of the min filled subsystems and increase those min filled subsystems by that percentage.

For the first subsystem 104(1): IDD=25%; RDP=80%; ARDP=40%; 40%*25%=10%; therefore, the DD=25%–10%–10%=5%.

For the second subsystem 104(2): IDD=25%; RDP=40%; ARDP=20%; 20%*25%=5%; therefore, the DD=25%–5%–5%=15%.

For the third subsystem 104(3): IDD=25%; therefore, the DD=25%+10%+5%=40%.

For the fourth subsystem 104(4): IDD=25%; DD=25%+10%+5%=40%.

In addition, as discussed above, all the subsystems 104(1)-104(4) in this example have known connections, so the selection list 138 may be sorted based on the differences between DD and CD for each subsystem 104(1)-104(4).

Thus, the third subsystem 104(3) may be ranked first: DD–CD=40%–12.5%=27.5% short.

The fourth subsystem 104(4) may be ranked second: DD–CD=40%–25%=15% short.

The first subsystem 104(1) may be ranked third: DD–CD=5%–25%=–20% short (20% too much).

The second subsystem 104(2) may be ranked fourth: DD–CD=15%–37.5%=–22.5% short (22.5% too much).

However, suppose that the maximum filled capacity threshold is set to 90%. Accordingly, since the first subsystem 104(1) is at 90% capacity, the selection list 138 is rearranged to move the first subsystem 104(1) to the bottom for a final selection order of the third subsystem 104(3), the fourth subsystem 104(4), the second subsystem 104(2) and the first subsystem 104(1).

Figure 5:
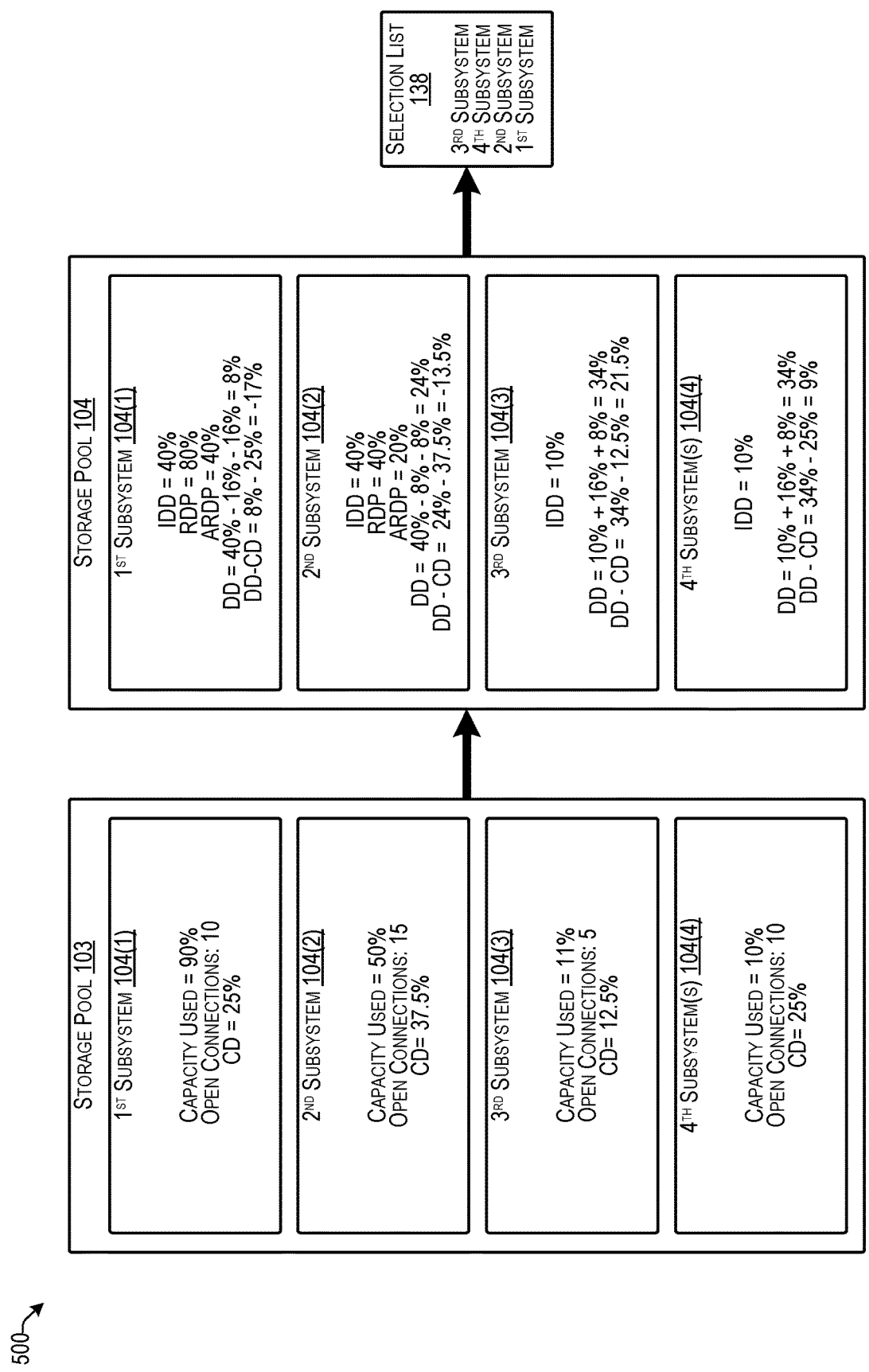
FIG. 5 is a block diagram illustrating an example of determining a selection list according to some implementations.

FIG. 5 is a block diagram illustrating an example 500 of determining a selection list 138 according to some implementations. In this example, suppose that the first subsystem 104(1) has 10 connections open, the second subsystem 104(2) has 15 connections open, the third subsystem 104(3) has 5 connections open, and the fourth subsystem 104(4) has 10 connections open. Accordingly, there are a total of 40 open connections. Thus, the CD of the first subsystem 104(1) is 25%; the CD of the second subsystem 104(2) is 37.5%; the CD of the third subsystem 104(3) is 12.5%; and the CD of the fourth subsystem 104(4) is 25%. Further, in this example, suppose that the current capacity used of the first subsystem 104(1) is 90%; the current capacity used of the second subsystem 104(2) is 50%; the current capacity used of the third subsystem 104(3) is 11%; and the current capacity used of the fourth subsystem 104(4) is 10%.

In this example, suppose that the subsystems 104(1)-104(4) have varied performance potential. For example, suppose that the first and second subsystems 104(1) and 104(2) report performance potential of 400 MB/s while the third and fourth subsystems 104(3) and 104(4) report performance potential of 100 MB/s. Accordingly, the initial desired distribution IDD is 40% for the first and second subsystems 104(1) and 104(2), i.e., (400 MB/s/(400 MB/s+ 400 MB/s+100 MB/s+100 MB/s)) and 10% for the third and fourth subsystems 104(3) and 104(4).

In addition, the first subsystem 104(1) and the second subsystem 104(2) are more than the balance threshold BT of 2% above the minimum-filled subsystem 104(4), so an RDP may be calculated for both the first and second subsystems 104(1) and 104(2). In this example, suppose that the skew multiplier has a value of 1, i.e., corresponding to balanced performance and capacity balancing.

For the first subsystem 104(1), the OOBP is 90−10=80% out of balance. Since the skew multiplier is 1, the RDP is also 80%. The two minimum filled subsystems 104(3) and 104(4) are within 2% capacity of each other and therefore considered balanced, so for the first subsystem 104(1), the ARDP is 80%/2=40%.

For the second subsystem, the OOBP is 50−10=40%. The RDP also equals 40% and the ARDP is 40%/2 or 20%.

Next, the desired distribution DD may be determined for each subsystem 104(1)-104(4). The DD may be determined based on the rule that any subsystem 104(1)-104(4) with an ARDP should reduce its IDD by the ARDP for each of the min filled subsystems and increase those min filled subsystems by that percentage.

For the first subsystem 104(1): IDD=40%; RDP=80%; ARDP=40%; 40%*40%=16%; therefore, the DD=40%−16%−16%=8%.

For the second subsystem 104(2): IDD=40%; RDP=40%; ARDP=20%; 20%*40%=8%; therefore, the DD=40%−8%−8%=24%.

For the third subsystem 104(3): IDD=10%; therefore, the DD=10%+16%+8%=34%.

For the fourth subsystem 104(4): IDD=10%; DD=10%+ 16%+8%=34%.

In addition, as discussed above, all the subsystems 104(1)-104(4) in this example have known connections, so the selection list 138 may be sorted based on the differences between DD and CD for each subsystem 104(1)-104(4).

Thus, the third subsystem 104(3) may be ranked first: DD−CD=34%−12.5%=21.5% short.

The fourth subsystem 104(4) may be ranked second: DD−CD=34%−25%=9% short.

The second subsystem 104(2) may be ranked third: DD−CD=24%−37.5%=−13.5% short (13.5% too much).

The first subsystem 104(1) may be ranked fourth: DD−CD=8%−25%=−17% short (17% too much).

In addition, suppose that the maximum filled capacity threshold is set to 90%. Accordingly, since the first subsystem 104(1) is at 90% capacity, the first subsystem 104(1) should be placed at the bottom of the selection list 138; however, as the first subsystem 104(1) is already ranked at the bottom, it is not necessary to rearrange the selection list 138 in this example.

Figure 6:
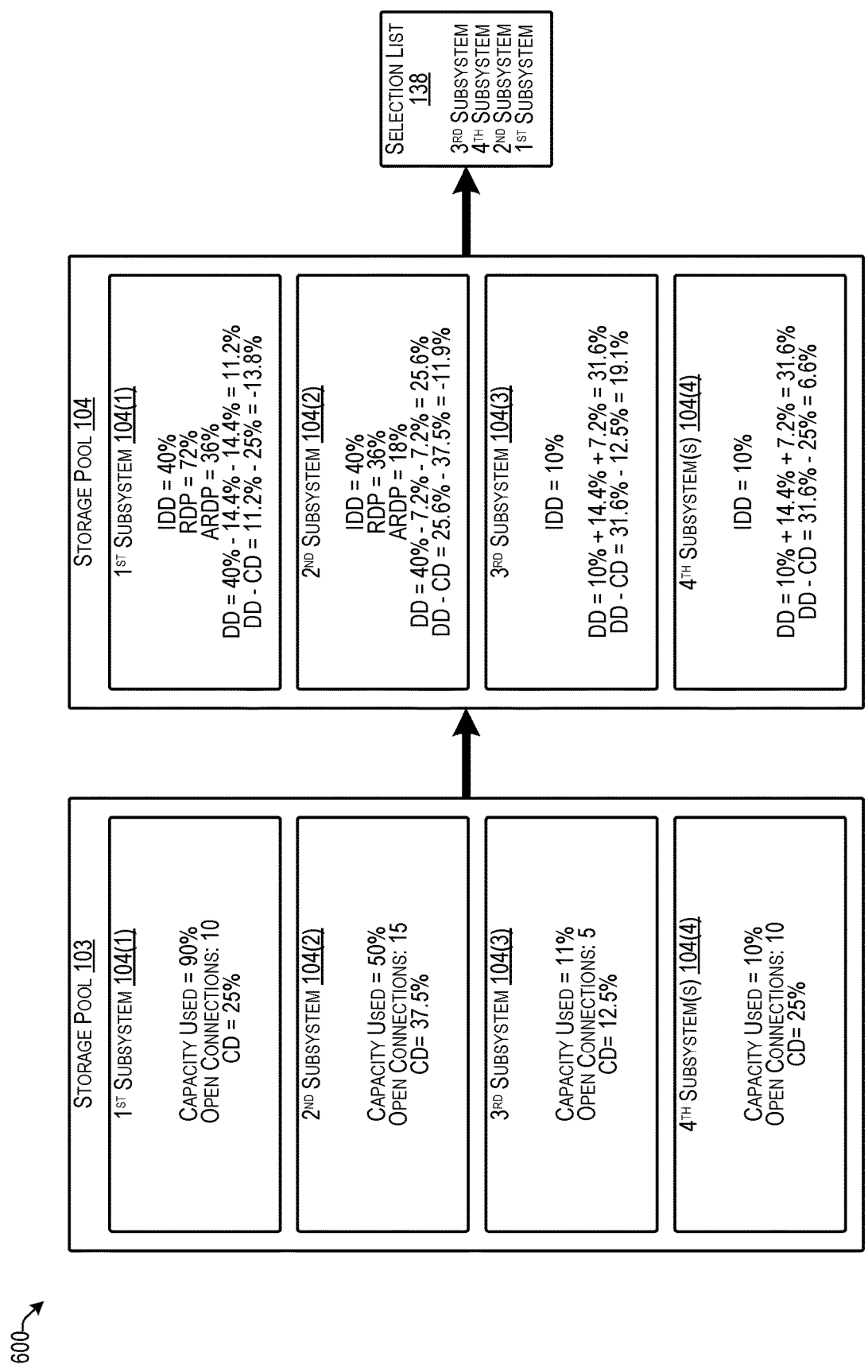
FIG. 6 is a block diagram illustrating an example of determining a selection list according to some implementations.

FIG. 6 is a block diagram illustrating an example 600 of determining a selection list 138 according to some implementations. In this example, suppose that the first subsystem 104(1) has 10 connections open, the second subsystem 104(2) has 15 connections open, the third subsystem 104(3) has 5 connections open, and the fourth subsystem 104(4) has 10 connections open. Accordingly, there are a total of 40 open connections. Thus, the current distribution CD of the first subsystem 104(1) is 25% (i.e., 10/40); the CD of the second subsystem 104(2) is 37.5% (15/40); the CD of the third subsystem 104(3) is 12.5% (5/40); and the CD of the fourth subsystem 104(4) is 25% (10/40). Further, in this example, suppose that the current capacity used of the first subsystem 104(1) is 90%; the current capacity used of the second subsystem 104(2) is 50%; the current capacity used of the third subsystem 104(3) is 11%; and the current capacity used of the fourth subsystem 104(4) is 10%.

In this example, suppose that the subsystems 104(1)-104(4) have varied performance potential. For example, suppose that the first and second subsystems 104(1) and 104(2) report performance potential of 400 MB/s while the third and fourth subsystems 104(3) and 104(4) report performance potential of 100 MB/s. Accordingly, the initial desired distribution IDD is 40% for the first and second subsystems 104(1) and 104(2), i.e., (400 MB/s/(400 MB/s+ 400 MB/s+100 MB/s+100 MB/s)) and 10% for the third and fourth subsystems 104(3) and 104(4).

In addition, the first subsystem 104(1) and the second subsystem 104(2) are more than the balance threshold BT of 2% above the minimum-filled subsystem 104(4), so an RDP may be calculated for both the first and second subsystems 104(1) and 104(2). In this example, suppose that the skew multiplier has a value of 0.9, i.e., corresponding to favoring performance over capacity balancing.

For the first subsystem 104(1), the OOBP is 90−10=80% out of balance. Since the skew multiplier is 0.9, the RDP is 0.9*80%=72%. The two minimum filled subsystems 104(3) and 104(4) are within 2% capacity of each other and therefore considered balanced, so for the first subsystem 104(1), the ARDP is 72%/2=36%.

For the second subsystem, the OOBP is 50−10=40%. The RDP equals 40%*0.9=36% and the ARDP is 36%/2 or 18%.

Next, the desired distribution DD may be determined for each subsystem 104(1)-104(4). The DD may be determined based on the rule that any subsystem 104(1)-104(4) with an ARDP should reduce its IDD by the ARDP for each of the min filled subsystems and increase those min filled subsystems by that percentage.

For the first subsystem 104(1): IDD=40%; RDP=72%; ARDP=36%; 36%*40%=14.4%; therefore, the DD=40%−14.4%−14.4%=11.2%.

For the second subsystem 104(2): IDD=40%; RDP=36%; ARDP=18%; 18%*40%=7.2%; therefore, the DD=40%−7.2%−7.2%=25.6%.

For the third subsystem 104(3): IDD=10%; therefore, the DD=10%+14.4%+7.2%=31.6%.

For the fourth subsystem 104(4): IDD=10%; therefore, the DD=10%+14.4%+7.2%=31.6%.

In addition, as discussed above, all the subsystems 104(1)-104(4) in this example have known connections, so the selection list 138 may be sorted based on the differences between DD and CD for each subsystem 104(1)-104(4).

Thus, the third subsystem 104(3) may be ranked first: DD−CD=31.6%−12.5%=19.1% short.

The fourth subsystem 104(4) may be ranked second: DD−CD=31.6%−25%=6.6% short.

The second subsystem 104(2) may be ranked third: DD−CD=25.6%−37.5%=−11.9% short (11.9% too much).

The first subsystem 104(1) may be ranked fourth: DD−CD=11.2%−25%=−13.8% short (13.8% too much).

In addition, suppose that the maximum filled capacity threshold is set to 90%. Accordingly, since the first subsystem 104(1) is at 90% capacity, the first subsystem 104(1) should be placed at the bottom of the selection list 138; however, as the first subsystem 104(1) is already ranked at the bottom, it is not necessary to rearrange the selection list 138 in this example.

Figure 7:
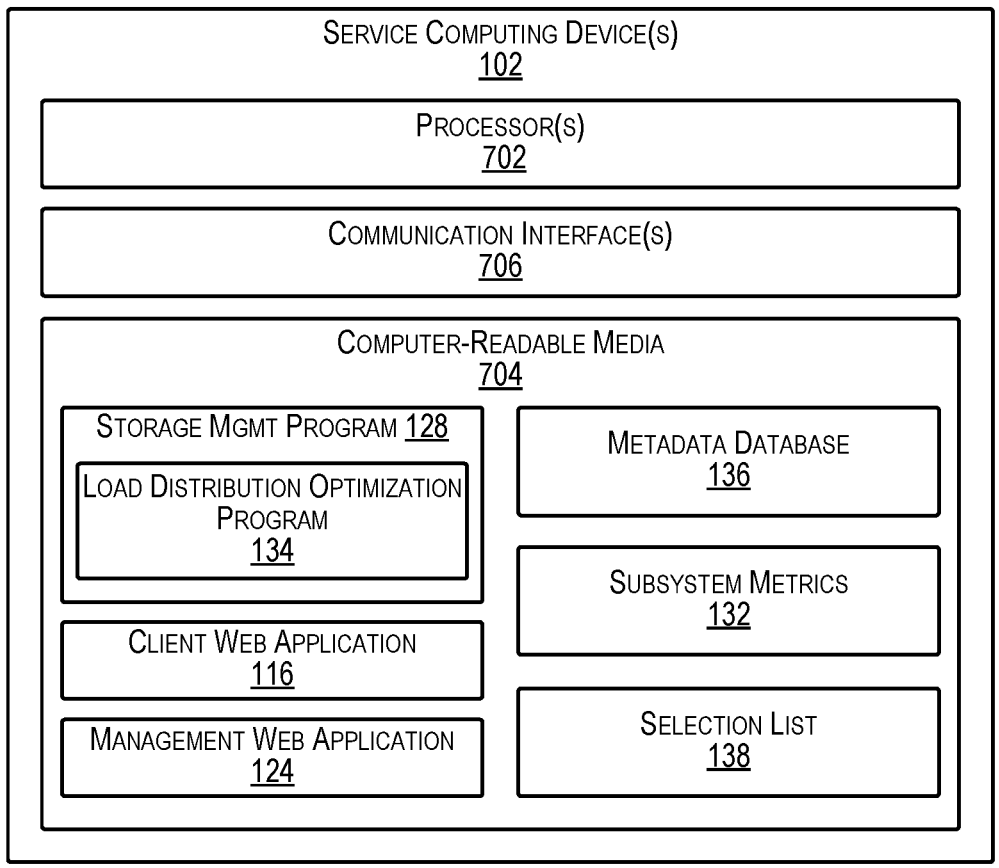
FIG. 7 illustrates select example components of the service computing device(s) that may be used to implement at least some of the functionality of the systems described herein.

FIG. 7 illustrates select example components of the service computing device(s) 102 that may be used to implement at least some of the functionality of the systems described herein. The service computing device(s) 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing device(s) 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 702, one or more computer-readable media 704, and one or more communication interfaces 706. Each processor 702 may be a single processing unit or a number of processing units, and may include single or multiple computing units, or multiple processing cores. The processor(s) 702 can be implemented as one or more central processing units, microprocessors, microcomputers, microcontrollers, digital signal processors, state machines, logic circuitries, and/or any devices that manipulate signals based on operational instructions. As one example, the processor(s) 702 may include one or more hardware processors and/or logic circuits of any suitable type specifically programmed or configured to execute the algorithms and processes described herein. The processor(s) 702 may be configured to fetch and execute computer-readable instructions stored in the computer-readable media 704, which may program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. For example, the computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 102, the computer-readable media 704 may be a tangible non-transitory medium to the extent that, when mentioned, non-transitory computer-readable media exclude media such as energy, carrier signals, electromagnetic waves, and/or signals per se. In some cases, the computer-readable media 704 may be at the same location as the service computing device 102, while in other examples, the computer-readable media 704 may be partially remote from the service computing device 102. For instance, in some cases, the computer-readable media 704 may include a portion of storage in the subsystem(s) 104 discussed above with respect to FIG. 1.

The computer-readable media 704 may be used to store any number of functional components that are executable by the processor(s) 702. In many implementations, these functional components comprise instructions or programs that are executable by the processor(s) 702 and that, when executed, specifically program the processor(s) 702 to perform the actions attributed herein to the service computing device 102. Functional components stored in the computer-readable media 704 may include the client web application 116, the management web application 124, and the storage management program 128, including the load distribution optimization program 134, each of which may include one or more computer programs, applications, executable code, or portions thereof. Further, while these programs are illustrated together in this example, during use, some or all of these programs may be executed on separate service computing device(s) 102.

In addition, the computer-readable media 704 may store data, data structures, and other information used for performing the functions and services described herein. For example, the computer-readable media 704 may store the metadata database 136, the subsystem metrics 132, and the selection list 138. Further, while these data structures are illustrated together in this example, during use, some or all of these data structures may be stored on separate service computing device(s) 102. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 706 may include one or more software and hardware components for enabling communication with various other devices, such as over the one or more network(s) 106 and 105. For example, the communication interface(s) 706 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Figure 8:
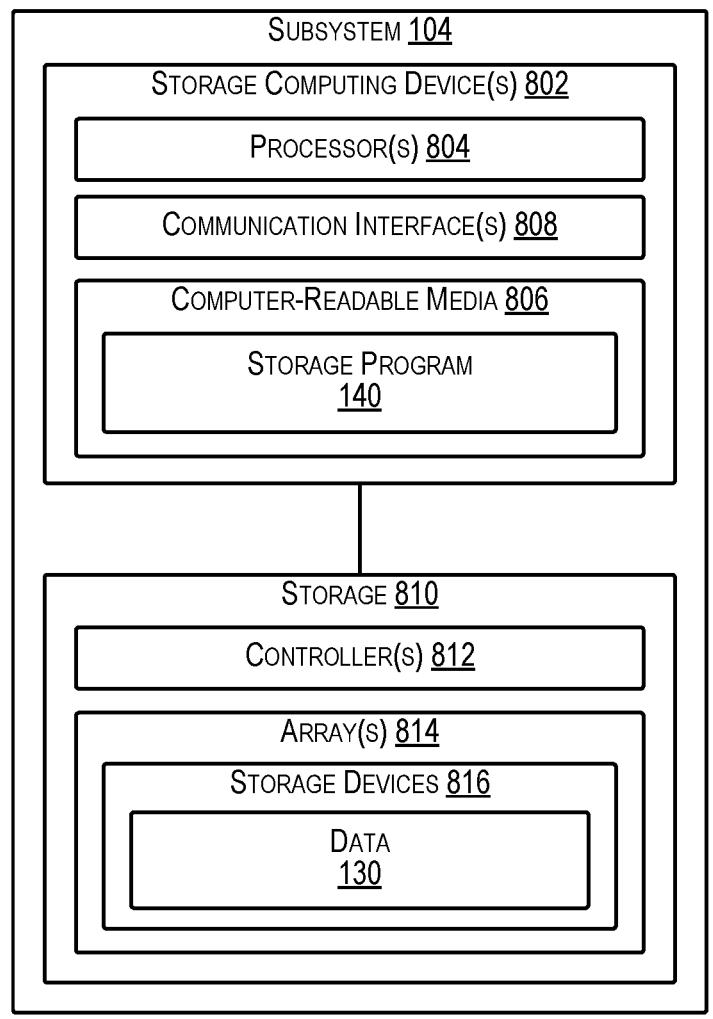
FIG. 8 illustrates select components of an example configuration of a subsystem according to some implementations.

FIG. 8 illustrates select components of an example configuration of a subsystem 104 according to some implementations. The subsystem 104 may include one or more storage computing devices 802, which may include one or more servers or any other suitable computing device, such as any of the examples discussed above with respect to the service computing device 102. The storage computing device(s) 802 may each include one or more processors 804, one or more computer-readable media 806, and one or more communication interfaces 808. For example, the processor(s) 804 may correspond to any of the examples discussed above with respect to the processors 702, the computer-readable media 806 may correspond to any of the examples discussed above with respect to the computer-readable media 704, and the communication interface(s) 808 may correspond to any of the examples discussed above with respect to the communication interfaces 706.

In addition, the computer-readable media 806 may include the storage program 140, discussed above, as a functional component executed by the one or more processors 804 for managing the storage of the data 130 on a storage 810 associated with the subsystem 104. The storage 810 may include one or more controllers 812 associated with the storage 150 for storing the data 130 on one or more trays, racks, extent groups, or other types of arrays 814 of storage devices 816. For instance, the controller 152 may control the arrays 814, such as for configuring the arrays 814, such as in an erasure coded protection configuration, or any of various other configurations, such as a RAID configuration, JBOD configuration, or the like, and/or for presenting storage extents, logical units, or the like, based on the storage devices 156 to the storage program 148, and for managing data 130 stored on the underlying physical storage devices 816. The storage devices 816 may be any type of storage device, such as hard disk drives, solid state drives, optical drives, magnetic tape, combinations thereof, and so forth.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
   a computing device configured to store data to a plurality of storage subsystems in a storage pool, the computing device configured by executable instructions to perform operations comprising:
   determining, by the computing device, for each storage subsystem, a performance potential quantity representative of a relative performance of the storage subsystem with respect to one or more other ones of the storage subsystems;
   determining, by the computing device, a respective initial distribution weighting for each storage subsystem based at least on the performance potential quantity for each storage subsystem;
   determining, by the computing device, for each storage subsystem having a percentage of storage capacity used that is more than a threshold amount greater than a percentage of storage capacity used by the storage subsystem having a lowest percentage of storage capacity used, one or more amounts by which to adjust the initial distribution weighting to determine a respective desired distribution weighting for each storage subsystem;
   determining a number of open connections to the plurality of storage subsystems;
   determining a current distribution for each storage subsystem based on the number of open connections to each storage subsystem;
   determining a ranking of the plurality of storage subsystems based at least on a difference between the respective desired distribution weighting for each storage subsystem and the current distribution for the storage subsystem;
   receiving, by the computing device, data for storage to the storage pool; and
   selecting one or more of the storage subsystems to receive the data based at least on the ranking determined for the plurality of storage subsystems.

2. The system as recited in claim 1, the operations further comprising:
   determining that the percentage of storage capacity used by a first one of the storage subsystems exceeds a threshold maximum for storage capacity used; and
   determining the ranking of the first storage subsystem based on the percentage of storage capacity used exceeding the threshold maximum.

3. The system as recited in claim 1, the operations further comprising receiving a respective indication of the performance potential quantity of each respective storage subsystem from the respective storage subsystem on a periodic basis.

4. The system as recited in claim 1, wherein determining, for each storage subsystem having a percentage of storage capacity used that is more than a threshold amount greater than a percentage of storage capacity used by the storage subsystem having a lowest percentage of storage capacity used, one or more amounts by which to adjust the initial distribution weighting further comprises operations of:
   determining, for each storage subsystem having the percentage of storage capacity used that is more than the threshold amount, an out of balance percentage, wherein the out of balance percentage is a difference between the percentage of storage capacity used and the percentage of storage capacity used by the storage subsystem having the lowest percentage of storage capacity used.

5. The system as recited in claim 4, the operations further comprising:
   determining, for each storage subsystem having the percentage of storage capacity used that is more than the threshold amount, a redistribution percentage based on multiplying the out of balance percentage by a skew multiplier.

6. The system as recited in claim 5, wherein the skew multiplier having a value of less than one increases system performance and the skew multiplier having a value of more than one increases system capacity balancing.

7. The system as recited in claim 5, the operations further comprising determining, for each storage subsystem having the percentage of storage capacity used that is more than the threshold amount, an adjusted redistribution percentage based on dividing the redistribution percentage by a number of the storage subsystems having a storage capacity used that is within the threshold amount of the storage capacity used by the storage subsystem having the lowest percentage of storage capacity used.

8. The system as recited in claim 7, the operations further comprising:
determining the respective desired distribution weighting for each storage subsystem having the adjusted redistribution percentage by multiplying the adjusted redistribution percentage by the initial distribution weighting for the respective storage subsystem to obtain a first value; and
subtracting the respective first value n times from the initial distribution weighting for the respective storage subsystem to determine the respective desired distribution weighting for the respective storage subsystem having the adjusted redistribution percentage, where n is the number of subsystems not having the adjusted redistribution percentage.

9. The system as recited in claim 8, the operations further comprising determining the respective desired distribution weighting for each storage subsystem not having an adjusted redistribution percentage by adding the respective first values determined for each of the storage subsystems having the adjusted redistribution percentage from the initial distribution weighting for each storage subsystem not having the adjusted redistribution percentage to determine the respective desired distribution weighting for the respective storage subsystem not having the adjusted redistribution percentage.

10. The system as recited in claim 1, wherein at least one of the storage subsystems has a performance or a storage capacity that is different from other ones of the storage subsystems.

11. A method comprising:
determining, by a computing device, for each storage subsystem of a plurality of storage subsystems in a storage pool, a performance potential quantity representative of a relative performance of the storage subsystem with respect to one or more other ones of the storage subsystems;
determining, by the computing device, a respective initial distribution weighting for each storage subsystem based at least on the performance potential quantity for each storage subsystem;
determining, by the computing device, for each storage subsystem having a percentage of storage capacity used that is more than a threshold amount greater than a percentage of storage capacity used by the storage subsystem having a lowest percentage of storage capacity used, one or more amounts by which to adjust the initial distribution weighting to determine a respective desired distribution weighting for each storage subsystem;

determining a number of open connections to the plurality of storage subsystems;
determining a current distribution for each storage subsystem based on the number of open connections to each storage subsystem;
determining a ranking of the plurality of storage subsystems based at least on a difference between the respective desired distribution weighting for each storage subsystem and the current distribution for the storage subsystem;
receiving, by the computing device, data for storage to the storage pool; and
selecting one of the storage subsystems to receive the data based at least on the ranking determined for the plurality of storage subsystems.

12. One or more non-transitory computer-readable media storing instructions that, when executed by one or more processors of a computing device, configure the computing device to perform operations comprising:
determining, by the computing device, for each storage subsystem of a plurality of storage subsystems in a storage pool, a performance potential quantity representative of a relative performance of the storage subsystem with respect to one or more other ones of the storage subsystems;
determining, by the computing device, a respective initial distribution weighting for each storage subsystem based at least on the performance potential quantity for each storage subsystem;
determining, by the computing device, for each storage subsystem having a percentage of storage capacity used that is more than a threshold amount greater than a percentage of storage capacity used by the storage subsystem having a lowest percentage of storage capacity used, one or more amounts by which to adjust the initial distribution weighting to determine a respective desired distribution weighting for each storage subsystem, wherein determining the one or more amounts by which to adjust the initial distribution weighting includes:
determining, for each storage subsystem having the percentage of storage capacity used that is more than the threshold amount, an out of balance percentage, wherein the out of balance percentage is a difference between the percentage of storage capacity used and the percentage of storage capacity used by the storage subsystem have having the lowest percentage of storage capacity used,
determining, for each storage subsystem having the percentage of storage capacity used that is more than the threshold amount, a redistribution percentage based on multiplying the out of balance percentage by a skew multiplier, and
determining, for each storage subsystem having the percentage of storage capacity used that is more than the threshold amount, an adjusted redistribution percentage based on dividing the redistribution percentage by a number of the storage subsystems having a storage capacity used that is within the threshold amount of the storage capacity used by the storage subsystem having the lowest percentage of storage capacity used,
determining the respective desired distribution weighting for each storage subsystem having the adjusted redistribution percentage by multiplying the adjusted redistribution percentage by the initial distribution weighting for the respective storage subsystem to obtain a first value, and subtracting the respective first value n times from the initial distribution weighting for the respective storage subsystem to determine the respective desired distribution weighting for the respective storage subsystem having the adjusted redistribution percentage, where n is a number of subsystems not having the adjusted redistribution percentage;

receiving, by the computing device, data for storage to the storage pool; and selecting one of the storage subsystems to receive the data based at least on the respective desired distribution weightings determined for the storage subsystems.

13. The one or more non-transitory computer-readable media as recited in claim 12, the operations further comprising:

determining a number of open connections to the plurality of storage subsystems;

determining a current distribution for each storage subsystem based on the number of open connections to each storage subsystem; and determining a ranking of the plurality of storage subsystems based at least on a difference between the respective desired distribution weighting for each storage subsystem and the current distribution for the storage subsystem, wherein selecting one of the storage subsystems to receive the data is based at least on the ranking of the plurality of storage subsystems.

14. The one or more non-transitory computer-readable media as recited in claim 13, the operations further comprising:

determining that the percentage of storage capacity used by a first one of the storage subsystems exceeds a threshold maximum for storage capacity used; and determining the ranking of the first storage subsystem based on the percentage of storage capacity used exceeding the threshold maximum.

15. The one or more non-transitory computer-readable media as recited in claim 12, wherein the skew multiplier having a value of less than one increases system performance and the skew multiplier having a value of more than one increases system capacity balancing.

16. The one or more non-transitory computer-readable media as recited in claim 12, the operations further comprising determining the respective desired distribution weighting for each storage subsystem not having an adjusted redistribution percentage by adding the respective first values determined for each of the storage subsystems having the adjusted redistribution percentage from the initial distribution weighting for each storage subsystem not having the adjusted redistribution percentage to determine the respective desired distribution weighting for the respective storage subsystem not having the adjusted redistribution percentage.

17. The one or more non-transitory computer-readable media as recited in claim 12, wherein at least one of the storage subsystems has a performance or a storage capacity that is different from other ones of the storage subsystems.

18. The method as recited in claim 11, further comprising:

determining that the percentage of storage capacity used by a first one of the storage subsystems exceeds a threshold maximum for storage capacity used; and determining the ranking of the first storage subsystem based on the percentage of storage capacity used exceeding the threshold maximum.

19. The method as recited in claim 11, further comprising receiving a respective indication of the performance potential quantity of each respective storage subsystem from the respective storage subsystem on a periodic basis.

20. The method as recited in claim 11, wherein determining the one or more amounts by which to adjust the initial distribution weighting includes:

determining, for each storage subsystem having the percentage of storage capacity used that is more than the threshold amount, an out of balance percentage, wherein the out of balance percentage is a difference between the percentage of storage capacity used and the percentage of storage capacity used by the storage subsystem have having the lowest percentage of storage capacity used, determining, for each storage subsystem having the percentage of storage capacity used that is more than the threshold amount, a redistribution percentage based on multiplying the out of balance percentage by a skew multiplier, and determining, for each storage subsystem having the percentage of storage capacity used that is more than the threshold amount, an adjusted redistribution percentage based on dividing the redistribution percentage by a number of the storage subsystems having a storage capacity used that is within the threshold amount of the storage capacity used by the storage subsystem having the lowest percentage of storage capacity used, determining the respective desired distribution weighting for each storage subsystem having the adjusted redistribution percentage by multiplying the adjusted redistribution percentage by the initial distribution weighting for the respective storage subsystem to obtain a first value, and subtracting the respective first value n times from the initial distribution weighting for the respective storage subsystem to determine the respective desired distribution weighting for the respective storage subsystem having the adjusted redistribution percentage, where n is a number of subsystems not having the adjusted redistribution percentage.

* * * * *